June 22, 1937.   C. R. BABB   2,084,967
MECHANISM FOR CUTTING SHEET MATERIAL
Filed Jan. 20, 1936   3 Sheets-Sheet 3
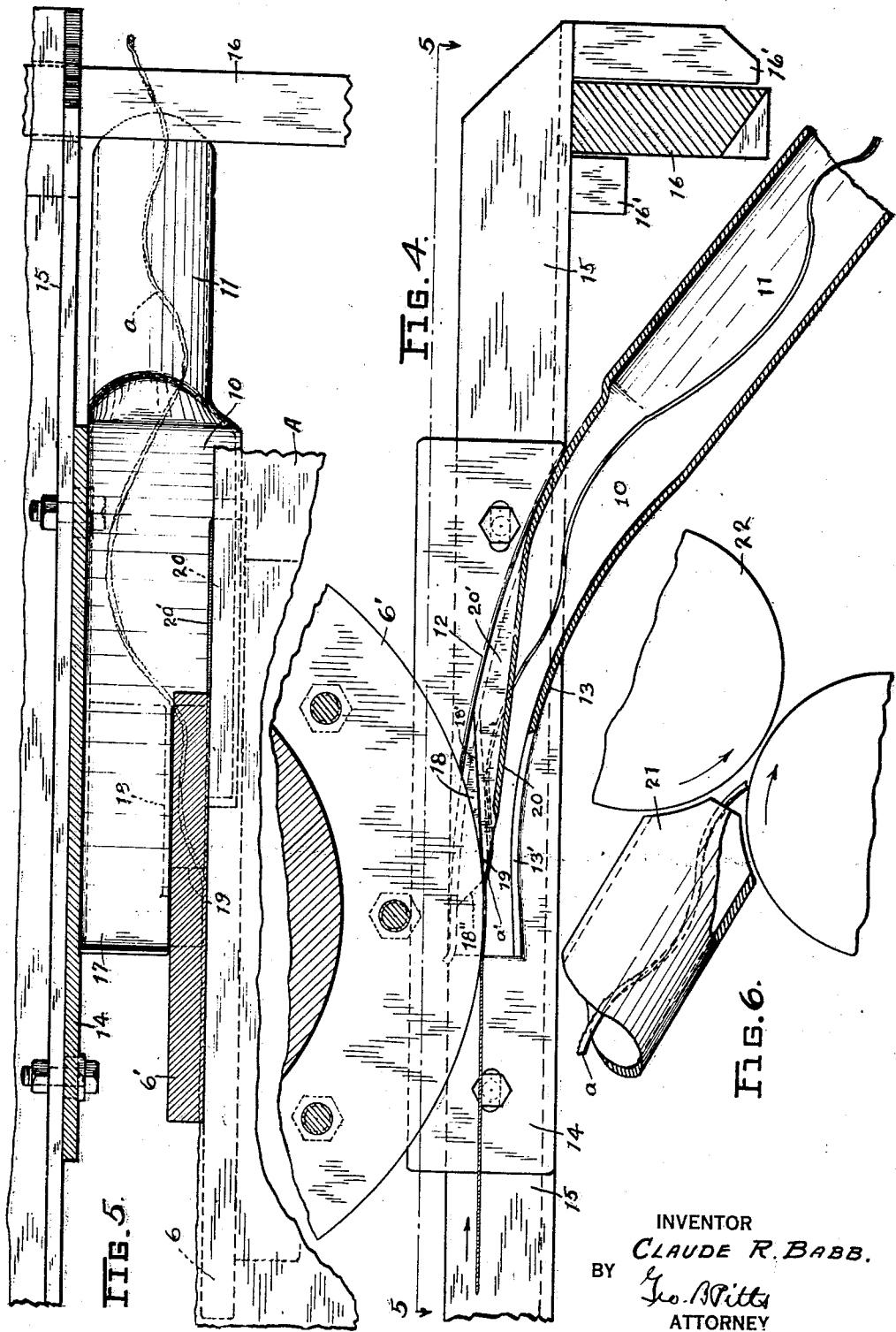
INVENTOR
CLAUDE R. BABB.
BY
ATTORNEY Patented June 22, 1937

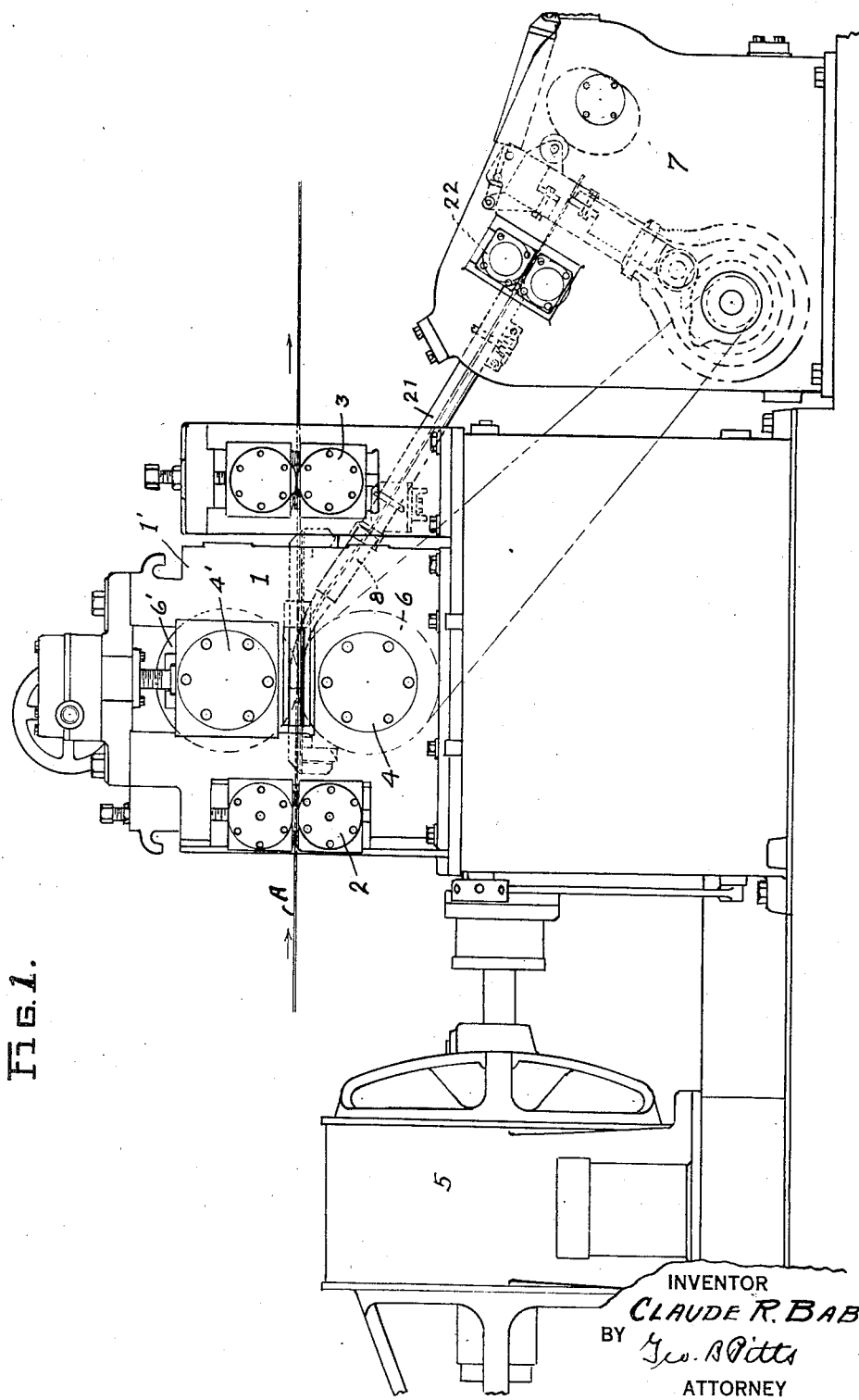

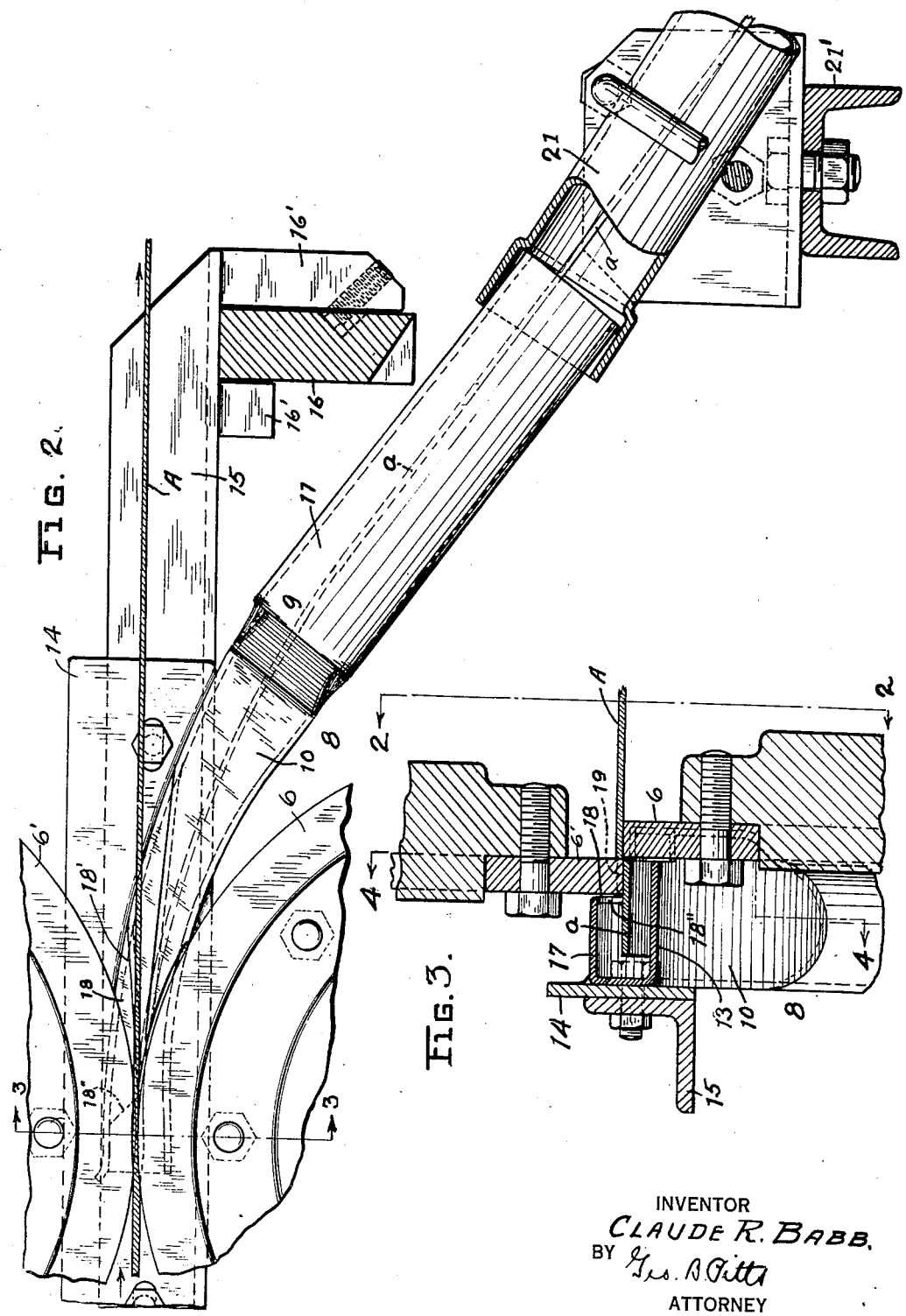

2,084,967

UNITED STATES PATENT OFFICE 2,084,967

MECHANISM FOR CUTTING SHEET MATERIAL

Claude R. Babb, Lakewood, Ohio, assignor to The Yoder Company, Cleveland, Ohio, a corporation of Ohio Application January 20, 1936, Serial No. 59,848

11 Claims. (Cl. 164—10.6)

This invention relates to mechanism for trimming sheet material. In the application of my invention I have adapted it to the trimming of sheet metal.

In trimming sheet metal great difficulty has been experienced in conducting away and handling the trimmed-off edge without its becoming tangled and twisted and in many cases affecting the operation of the trimming cutters. As this edge may be and often is a long continuous strip, it is not easily handled when in this condition. Where the trimmed-off edge is relatively wide, it can be readily guided away from the trimming cutters, but where it is narrow, the guide walls cannot be set close enough to prevent twisting and curling of the edge and as the edge to be trimmed off in actual practice varies greatly in width and portions thereof may be very narrow, twisting thereof cannot be readily avoided. I have provided an improved device which adapts itself to both wide and narrow edges and operates to carry the edge away from the cutters without danger of affecting their operation and without affecting the discharge of the trimmed-off edge.

One object of the invention is to provide an improved machine of this character having a guide means for the trimmed-off edge or scrap material, whereby the latter is separated from the main portion of the material and guided to a point of discharge.

Another object of the invention is to provide for a trimming machine an improved device for separating, controlling and guiding the trimmed-off material, whereby the material may be fed to and through the machine at high speed.

Another object of the invention is to provide for a trimming machine an improved device for separating the trimmed-off edge or scrap from the main portion of the material, constructed and arranged to be positioned in close proximity to the cutters, so that the scrap may be engaged immediately after it is cut off and guided to a point of discharge.

Other objects of the invention will be apparent to those skilled in the art to which my invention relates from the following description taken in connection with the accompanying drawings, wherein Fig. 1 is a side elevation of a mechanism embodying my invention.

Fig. 2 is a fragmentary view showing one set of trimming devices or cutters and the device for separating the trimmed-off edge from the main portion of the material, and controlling and guiding it; being a section on the line 2—2 of Fig. 3.

Fig. 3 is a section on the line 3—3 of Fig. 2.

Fig. 4 is a section on the line 4—4 of Fig. 3.

Fig. 5 is a section on the line 5—5 of Fig. 4; this view showing the trimming off of a narrow edge.

Fig. 6 is a fragmentary view showing diagrammatically the feed of the scrap material to the scrap cutting mechanism.

In the drawings, 1 indicates as an entirety a trimming mechanism of any desired construction, but preferably comprising front and rear pairs of pinch rolls 2, 3 and a pair of shafts 4, 4', driven by a motor 5. The shafts 4, 4', carrying a pair or pairs of rotary cutters 6, 6', arranged to trim either or both edges of the material A as it is fed in the direction indicated by the arrows in Figs. 1, 2, and 4. 7 indicates a mechanism for cutting the trimmed-off edge or scrap $a$ into sections. By preference the trimming mechanism 1 and scrap cutting mechanism 7 are substantially similar in construction to the respective like mechanisms shown in the co-pending application filed by Carl M. Yoder, of Lakewood, Ohio, Ser. No. 12,818. Accordingly, the trimming mechanism 1 is provided with two sets of rotary trimming cutters 6, 6'. A device, indicated as an entirety at 8, is related to each of the sets of cutters for deflecting one of the trimmed-off edges away from the trimmed material and guiding it to a point of discharge and a scrap cutting mechanism arranged to cut each trimmed-off edge into sections, although I have shown in detail but one set of cutters, the device 8 associated therewith and one scrap cutting mechanism.

The cutters of each set of cutters co-act as shown in Figs. 2 and 3 to trim the adjacent edge portion of the material A, whereas the device 8, which is disposed in co-operative relation to the cutters, is provided with means to deflect the trimmed-off edge and hence separate it from the main portion of the material, as later set forth. The devices 8 are similar in construction (for which reason only one need be shown and described), but oppositely related to co-operate with the preferred arrangement of the sets of cutters.

The device 8 comprises the following: 9 indicates a hollow member consisting of a receiving section 10, provided at its outer end with a guide section 11, the respective side walls of sections being welded together or formed integral. The guide section 11 is preferably tubular in shape, whereas the receiving section 10 is preferably of general rectangular shape in cross section, its upper and lower walls being curved as shown at 12, 13, so as to direct the trimmed-off material downwardly, and disposed in converging relation to form at their forward ends a throat, the end and side walls of which are shaped to permit assembly of the receiving section in operative relation to the point of contact between the adjacent cutters. The outer side wall of the receiving section has secured to it, as by welding, a plate 14, which is adjustably secured to an adjacent angle 15. The angles 15 extend longitudinally of the standards 1' (only one being shown) which support the cutter carrying shafts 4, 4'. The angles 15 are supported on cross bars 16 and provided with depending members 16', which engage the cross bars 16 to hold the angles 15 in position. Each plate 14 is bolted to the adjacent angle 15, the openings for the bolts being elongated so that the plate may be adjusted along the adjacent angle and position the throat of the receiving section in operative relation to the cutters 6, 6'. The lower wall 13 of the receiving section 10 is cut away, as shown at 13' to accommodate the lower cutter 6. The outer end portion of the upper wall 12 is shaped to form a plurality of longitudinally extending guides. For this purpose the outer longitudinal portion 17 of this wall extends forwardly of the point of contact between the cutters and above the plane of the material to receive the marginal portion thereof and is provided along its inner edge rearwardly of the point of contact with a side wall 18, which depends downwardly in a plane at the outer side of the upper cutter 6'. The intermediate longitudinal portion 18' of the upper wall has a width substantially equal to that of the upper cutter and is disposed below it and rearwardly of the point of contact between the cutters, and extends rearwardly in the plane of the upper cutter 6'. The front transverse edge 19 of the wall 18' is arranged in close relation to the point of contact between the cutters and in the path of the material as it feds to and between the cutters. Accordingly, as the material feeds past the point of contact and is trimmed or severed, the trimmed-off portion a engages the transverse edge 19 which deflects it downwardly relative to the trimmed portion of the material, as shown in Fig. 4. The free or front edge 18" of the side wall 18 is arranged rearwardly of an imaginary line cutting the axes of the cutters and is inclined downwardly and rearwardly, its lower end coinciding with the deflector 19 to support the outer end of the latter. The inner longitudinal portion 20 of the top wall extends in the plane of the lower cutter 6 and below the plane of material, but terminates rearward of the deflector 19. The walls 18' and 20 are arranged in different horizontal planes and connected along their adjacent sides by a vertical side wall 20' which is in alinement with the line of cut or severance effected by the cutters, the forward end 20" of the wall 20' being extended to the outer end of the deflector 19 and inclined downward therefrom to the front end of the wall 20. In this arrangement the wall 20" extends approximately to the point of contact between the cutters in a plane coinciding with that of the coacting edges of the cutters and accordingly forms a division or separating wall between the trimmed material and trimmed-off edge immediately following the operation of the cutters. The inclined edge 20" may be beveled outwardly so as to move the edge laterally following its severance. The front or forward terminal edge of the wall 20 is arranged transversely of the feed of the material and serves as a guide for the trimmed marginal edge of the material to deflect it upwardly in the event of any tendency for the material to follow the trimmed-off edge.

The deflector 19 is preferably inclined or beveled which permits it to be set in close relation to the cutter 6' so as to engage the trimmed-off edge immediately following its severance and to deflect or guide the scrap downwardly, as shown at a'. To insure effective relation of the deflector 19 to the point of contact between the cutters 6, 6', the wall 18' is inclined downwardly and forwardly. As the wall 18' has a width substantially equal to the width of the cutter 6', and the wall 20' extends downwardly along its inner edge, the trimmed material may feed past the receiving section 10 without being guided upwardly or downwardly.

In Fig. 3 the cutters 6, 6', are shown trimming off a relatively wide edge a, whereas Figs. 4 and 5 show the trimming off of a narrow edge. As the edge a is deflected from the trimmed material and guided into a hollow member, such edge is free to twist while being guided therethrough. The guide section 11 communicates with a separate guide 21 the discharge end of which is related to the feed rolls 22 of the scrap cutting mechanism 7. As these rolls are driven in opposite directions, as indicated by the arrows in Fig. 6, the scrap or trimmed-off edge a is directed between them.

The upper end of the guide 21 is secured to a cross member 21' carried by the standards 1a for the rolls 3.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a machine having a set of cutters for trimming the marginal edge of sheet material and means for feeding material thereto, a hollow member having its inner end disposed in operative relation to the cutters to receive the marginal edge of the material and provided with a wall disposed in the plane of one of the cutters, the terminating edge of said wall being disposed transversely of the cutter and arranged to deflect from the plane of the material the trimmed-off edge, and guide means for the trimmed-off edge.

2. In a machine having a set of cutters for trimming the marginal edge of sheet material and means for feeding material thereto, a hollow member having its inner end disposed in operative relation to the cutters to receive the marginal edge of the material and provided with spaced guide walls extending rearwardly of and in the planes of the cutters, the terminating edge of one of said walls being arranged to engage the trimmed-off edge of the material and guide it into said hollow member and the other wall being arranged to guide the trimmed material past said member.

3. In a machine having a set of cutters for trimming the marginal edge of sheet material and means for feeding material thereto, a hollow member having its inner end disposed in operative relation to the cutters to receive the marginal edge of the material and provided with a wall disposed in the plane of one of the cutters and having a terminating beveled edge arranged adjacent to and rearward of the point of contact of said cutters for deflecting the trimmed-off edge into said member.

4. In a machine having a set of cutters for trimming the marginal edge of sheet material and means for feeding the material thereto, a hollow member having upper and lower walls forming at their inner ends a throat related to the cutters, said upper wall having longitudinal portions arranged side by side in different planes, one of said portions being extended beyond the other portion toward the cutters and arranged to engage the trimmed-off edge of the material and guide it into said member and the other portion being arranged to guide the trimmed material past said member.

5. In a machine having a set of cutters for trimming the marginal edge of sheet material and means for feeding the material thereto, a hollow member having upper and lower walls forming at their inner ends a throat related to the cutters, said upper wall having longitudinal portions arranged side by side in different planes, one of said portions extending forwardly beyond the point of contact between the cutters and the other portion being in line with one of the cutters and having a transverse terminating end arranged to engage the trimmed-off edge and guide it into said member.

6. In a machine having a set of cutters for trimming the marginal edge of sheet material and means for feeding the material thereto, a hollow member having upper and lower walls forming at their inner ends a throat related to the cutters, said upper wall having longitudinal portions arranged side by side in different planes, one of said portions extending forwardly beyond the point of contact between the cutters and the other portion being in line with one of the cutters and having a transverse terminating end arranged to engage the trimmed-off edge and guide it into said member, and a wall for guiding the trimmed material past said member.

7. In a machine having a set of cutters for trimming the marginal edge of sheet material and means for feeding the material thereto, a hollow member having its inner end related to the point of contact between the cutters, the upper wall of said member having a longitudinally extending portion the terminating end of which is arranged in the path of movement of the trimmed-off edge of the material as it leaves the cutters and operates to guide the edge into said member.

8. In a machine having a set of cutters for trimming the marginal edge of sheet material and means for feeding the material thereto, a hollow member having its inner end related to the point of contact between the cutters, the upper wall of said member having a longitudinally extending portion the terminating end of which is arranged in the path of movement of the trimmed-off edge of the material as it leaves the cutters and operates to guide the edge into said member, and a wall perpendicular to said portion in alinement with the line of severance of the material.

9. In a machine having a set of cutters for trimming the marginal edge of sheet material and means for feeding the material thereto, a hollow member having its inner end related to the point of contact between the cutters, the upper wall of said member having a longitudinally extending portion the terminating end of which is arranged in the path of movement of the trimmed-off edge of the material as it leaves the cutters and operates to guide the edge into said member, and a wall perpendicular to said portion in alinement with the line of severance of the material, said wall extending along said portion to its terminating end.

10. In a machine having a pair of rotary cutters for trimming the marginal edge of sheet material and means for feeding material to the cutters, a hollow member having its inner end operatively related to the coacting edges of the cutters, a wall of said member being disposed between the trimmed-off edge and the adjacent cutter and terminating in the path of movement of the advancing trimmed-off edge to deflect it from its path.

11. In a machine having a pair of rotary cutters for trimming the marginal edge of sheet material and means for feeding material to the cutters, a hollow member having its inner end operatively related to the coacting edges of the cutters, a wall of said member being disposed between the trimmed-off edge and the adjacent cutter and terminating in the path of movement of the advancing trimmed-off edge to deflect it from its path into said member, the walls of said member serving to guide away the trimmed-off edge.

CLAUDE R. BABB.